US005877225A

United States Patent [19]

Blinn et al.

[11] Patent Number: 5,877,225

[45] **Date of Patent: *Mar. 2, 1999**

[54] METHOD OF REDUCING THE VOLUME OF A MIXTURE OF RESIN POWDER AND INERT SYNTHETIC FIBERS

[75] Inventors: Klaus Blinn, Rödermark; Karl-Heinz Kleinschroth, Moerfelden-Walldorf; Dietmar Bege, Erlangen, all of Germany

[73] Assignee: Siemens Aktiengesellschaft, Munich, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 766,995

[22] Filed: Dec. 16, 1996

Related U.S. Application Data

[63] Continuation of PCT/DE95/00724 Jun. 2, 1995, published as WO95/34900, Dec. 21, 1995.

[30] Foreign Application Priority Data

Jun. 14, 1994 [DE] Germany .......................... 44 20 658.5

[51] Int. Cl.[6] ................................ C08J 7/02; G21F 9/28; G21F 9/34

[52] U.S. Cl. ............................. 521/28; 521/30; 525/325; 525/343; 525/362; 525/370; 525/371; 525/374; 588/7; 588/13

[58] Field of Search ........................... 521/28, 30; 588/7, 588/13

[56] References Cited

U.S. PATENT DOCUMENTS

| | | | |
|---|---|---|---|
| 3,791,981 | 2/1974 | Calmon . | |
| 4,259,229 | 3/1981 | Nikitin | 524/709 |
| 4,530,723 | 7/1985 | Smeltzer | 521/29 |
| 4,762,647 | 8/1988 | Smeltzer | 588/20 |
| 4,810,449 | 3/1989 | Reinehr | 264/182 |

FOREIGN PATENT DOCUMENTS

| | | |
|---|---|---|
| 0 182 172 B1 | 5/1986 | European Pat. Off. . |
| 0 262 823 A2 | 4/1988 | European Pat. Off. . |

OTHER PUBLICATIONS

Japanese Patent Abstract No. 86–065767.

*Primary Examiner*—Fred Zitomer
*Attorney, Agent, or Firm*—Herbert L. Lerner; Laurence A. Greenberg

[57] ABSTRACT

A method of reducing the volume of a mixture of filter fibers and a powder-form ion-exchange resin, produces a waste product that is particularly suitable for ultimate disposal. A solvent which dissolves the filter fibers is added to the mixture and a mixture which is thus formed is first dried and then given an additional heat treatment.

8 Claims, No Drawings

METHOD OF REDUCING THE VOLUME OF A MIXTURE OF RESIN POWDER AND INERT SYNTHETIC FIBERS

CROSS-REFERENCE TO RELATED APPLICATIONS

This application is a Continuation of International Application Ser. No. PCT/DE95/00724, filed Jun. 2, 1995, published as WO95/34900, Dec. 21, 1995.

BACKGROUND OF THE INVENTION

1. Field of the Invention

The invention relates to a method of reducing the volume of a mixture of filter fibers and a powder-form ion-exchange resin.

In nuclear power stations, powder-form ion-exchange resins are used in the form of precoat layers for purifying condensates and wastewater streams, for example. In order to improve the precoat behavior and the service life of the precoat layer acting as a filter, inert material in the form of short, thin filter fibers is added to the powder-form ion-exchange resin, which is also referred to below as resin powder. Those filter fibers generally are formed of polyacrylonitrile. When the precoat is being deposited on the filter, the fibers accumulate as a disordered heap. The resin powder particles are fixed in intersticial spaces of the heap. A precoat layer which is made up in this manner has a low resistance to flow and is distinguished by the fact that no cracks form. Such cracks, which are frequently caused by shrinkage processes, may frequently be observed in pure resin powder precoat layers without filter fibers.

However, the advantages that those combined precoat materials offer for the operation of power stations of that type are opposed by certain disadvantages in the disposal of the used filter materials. In other words, the used filter materials are customarily flushed, as a suspension, into high-integrity containers and are dewatered therein through built-in filter candles or multiple tube filters. The containers that are charged with the dewatered filter materials are taken to ultimate disposal in that state. Due to the filter material structure that was already described at the outset, the amount of filter material which can be introduced per unit volume is very low. In that case, the apparent compacted density of typical resin powder precoat materials is between 0.37 $g/cm^3$ and 0.42 $g/cm^3$ in the as-delivered state. Although drying the material decreases the volume by about 35%, if water penetrates into the containers charged with the dried filter material in the final repository, there is the danger of destruction of the package due to resulting swelling pressure.

SUMMARY OF THE INVENTION

It is accordingly an object of the invention to provide a method of reducing the volume of a mixture of resin powder and inert synthetic fibers, which overcomes the hereinafore-mentioned disadvantages of the heretofore-known methods of this general type and in which a waste product suitable for ultimate disposal is produced by particularly effectively reducing the volume of a mixture of filter fibers and a powder-form ion-exchange resin.

With the foregoing and other objects in view there is provided, in accordance with the invention, a method of reducing the volume of a mixture of filter fibers and a powder-form ion-exchange resin, which comprises adding a solvent to the mixture of filter fibers and a powder-form ion-exchange resin for dissolving the filter fibers to form a resultant mixture; and first drying and then additionally heat treating the resultant mixture.

European Patent 0 182 172 B1 also already discloses a method for improving the stability properties of solidified radioactive ion-exchange resin particles, in which the ion-exchange resin particles are modified by an additive and, if appropriate, by heat treatment in such a manner that the swelling and shrinking behavior is reduced. However, in that case an additive having a purely ionic action is involved which is neither intended nor suitable for solubilizing or dissolving filter fibers.

The invention starts from the consideration that the proportion of inert filter fibers in the mixture, i.e. in the resin powder precoat materials, is of critical importance for the ineffective space utilization in ultimate disposal as a radioactive waste product.

The drying process therefore first acts to remove the water which is present in the waste, in such a way that adding the substance solubilizing or dissolving the filter fibers, i.e. adding the solvent, breaks down the structure of the filter fiber proportion. This gives a considerable reduction in volume of the waste product. In this case, drying is expediently carried out at atmospheric pressure or in vacuo, with the drying temperature being between 40° C. and 200° C., preferably 60° C. to 120° C.

The solvent can be added before, during or after the drying process. In accordance with another mode of the invention, the structural breakdown of filter fibers that are generally formed of polyacrylonitrile uses the following organic substances, inter alia, which are suitable as a solvent: dimethylformamide, dimethylacetamide, dimethyl sulfoxide, ethylene carbonate. In addition, the following inorganic substances, for example, are suitable as a solvent: salts of thiocyanic acid, nitric acid and sulfuric acid, and zinc chloride.

The drying process is followed by the additional heat treatment. In accordance with a further mode of the invention, the additional heat treatment acts to reduce the swelling behavior or swelling of the dried resin powders and is carried out in a temperature range between 120° C. and 220° C., preferably between 130° C. and 190° C.

If the organic substances are used as a solvent, they are removed from the mixture, e.g. by distillation, after completion of the drying process or at the beginning of the additional heat treatment. In contrast, inorganic substances used as a solvent remain completely in the waste product.

In accordance with an added mode of the invention, in order to accelerate the additional heat treatment process, alkaline substances, such as sodium hydroxide, potassium carbonate, calcium oxide, calcium hydroxide or borates are expediently added, in amounts between 10 and 50 percent by weight, to the dried, solvent-treated resin powder products. Alternatively, acidic substances, such as aluminum salts, zinc salts and iron is salts, boric acid or phosphorous pentoxide, likewise in amounts between 10 and 50 percent by weight, can be added.

In accordance with an additional mode of the invention, in order to correct a pH which possibly results from the treatment and which is unsuitable for ultimate disposal, and in order to improve the leaching behavior, acidic mixtures which are essentially present in the resin powder products in this treatment stage are buffered to a neutral to slightly basic pH range by admixture of calcium oxide or magnesium oxide. This also avoids package corrosion, for example.

In accordance with a concomitant mode of the invention, strongly alkaline resin powder products are buffered by using boric acid or acidic phosphates.

Other features which are considered as characteristic for the invention are set forth in the appended claims.

Although the invention is illustrated and described herein as embodied in a method of reducing the volume of a mixture of resin powder and inert synthetic fibers, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the following example.

EXAMPLE OF USE 100 g of ECODEX X-203-H in the as-delivered state (ECODEX X-203-H is a well known ion exchange powder resin formed of an ion exchanger and additional inertial material), having a water content of 63.2% and a compacted volume of 296 ml are mixed with 50 g of anhydrous zinc chloride by intensive shaking in a one liter round-bottom flask. The mixture is then dried at a pressure of approximately 50 mbar in a rotary evaporator in an oil bath at a temperature of 80° C. When the majority of the water has distilled over after a period of about half an hour, the temperature of the oil bath is set to 160° C., with the reaction mixture being kept at this temperature for a period of one hour. After the round-bottom flask has cooled, 61.2 g of a crumbly, deep black reaction product are isolated. The volume of this reaction product was determined as 90 ml, after comminution of the coarse-grained fraction.

No measurable swelling could be observed when the black mass was moistened. Mixing 40.5 g of the reaction product with 7.35 g of magnesium oxide produced, without increasing the volume, a dark gray powder which showed considerable resistance to the introduction of water because of the formation of basic zinc salts and magnesium salts.

We claim:

1. A method of reducing the volume of a radioactive waste mixture of filter fibers and a powder-form ion-exchange resin, which comprises:

dissolving filter fibers in a radioactive waste mixture comprising filter fibers and a powder-form ion-exchange resin by adding a solvent to the radioactive waste mixture forming a resultant mixture; and first drying and then additionally heat treating the resultant mixture.

2. The method according to claim 1, which comprises carrying out the dissolving step by adding a solvent selected from the group consisting of dimethylformamide, dimethylacetamide, dimethyl sulfoxide, ethylene carbonate and a solution of zinc chloride to dissolve polyacrylonitrile filter fibers.

3. The method according to claim 1, which comprises carrying out the additional heat treatment step by adding between 10 and 50% by weight of a substance selected from the group consisting of sodium hydroxide, potassium carbonate, calcium oxide, calcium hydroxide, borate salts and phosphorus pentoxide to the dried, solvent-treated mixture in a temperature range between 120° C. and 220° C.

4. The method according to claim 1, which comprises carrying out the additional heat treatment step by adding between 10 and 50% by weight of a substance selected from the group consisting of sodium hydroxide, potassium carbonate, calcium oxide, calcium hydroxide, borate and phosphorus pentoxide to the dried, solvent-treated mixture in a temperature range between 130° C. and 190° C.

5. The method according to claim 1, which comprises mixing acidic mixtures with calcium oxide or magnesium oxide until a neutral to slightly basic pH is established, to avoid package corrosion.

6. The method according to claim 1, which comprises mixing alkaline mixtures with boric acid or acidic phosphate until an at least approximately neutral pH is established.

7. A method of reducing the volume of a radioactive waste mixture of filter fibers and a powder-form ion-exchange resin, which comprises:

dissolving filter fibers in a radioactive waste mixture comprising filter fibers and a powder-form ion-exchange resin by adding a zinc chloride solution to the radioactive waste mixture forming a resultant mixture; and first drying and then additionally heat treating the resultant mixture.

8. A method of reducing the volume of a radioactive waste mixture of filter fibers, water and a powder-form ion-exchange resin, which comprises:

dissolving filter fibers in a radioactive waste mixture comprising filter fibers, water, and a powder-form ion-exchange resin by mixing a zinc chloride solid with the water of the radioactive waste mixture forming a resultant mixture; and first drying and then additionally heat treating the resultant mixture.

* * * * *